(12) United States Patent
Staykoff

(10) Patent No.: US 9,060,256 B2
(45) Date of Patent: Jun. 16, 2015

(54) GENERIC USSD CENTRE FOR NETWORK APPLICATIONS AND SERVICES

(76) Inventor: Constantin Staykoff, Sofia (BG)

(*) Notice: Subject to any disclaimer, the term of this patent is extended or adjusted under 35 U.S.C. 154(b) by 282 days.

(21) Appl. No.: 13/061,150

(22) PCT Filed: Aug. 28, 2009

(86) PCT No.: PCT/FR2009/001045
§ 371 (c)(1),
(2), (4) Date: Feb. 27, 2011

(87) PCT Pub. No.: WO2010/026306
PCT Pub. Date: Mar. 11, 2010

(65) Prior Publication Data
US 2011/0151845 A1    Jun. 23, 2011

(30) Foreign Application Priority Data

Sep. 2, 2008 (FR) ..................... 08 04815

(51) Int. Cl.
*H04W 4/00* (2009.01)
*H04W 4/14* (2009.01)
(Continued)

(52) U.S. Cl.
CPC ............... *H04W 4/14* (2013.01); *H04W 88/18* (2013.01); *H04W 88/184* (2013.01); *H04L 67/04* (2013.01)

(58) Field of Classification Search
CPC ..... H04W 4/14; H04W 88/18; H04W 88/184; H04L 67/04
USPC ...................................... 709/249; 455/414.1
See application file for complete search history.

(56) References Cited

U.S. PATENT DOCUMENTS 6,477,366 B1    11/2002    Valentine et al.
7,010,603 B2 *  3/2006    Martin et al. ................. 709/227
(Continued)

OTHER PUBLICATIONS

Anonymous: "Redefining over-the-phone customer service" Internet Article, Online Mar. 31, 2008, URL:http://www.voiceobjects.com/files/en/voiceobjects_7_products_brief_en.pdf.
(Continued)

*Primary Examiner* — Kevin Bates
*Assistant Examiner* — Nazia Naoreen
(74) *Attorney, Agent, or Firm* — Bill Killough; Barnwell Whaley Patterson & Helms

(57) ABSTRACT

The invention relates to a digital telecommunication system for the access, navigation, and use of digital applications and services, referred to as a USSD CENTRE (14), that comprises at least one server for applications and services module (16), at least one access gateway module (17), at least one network gateway module (18), at least one integration gateway module (15) and at least one database and profiling module (19). The server for applications and services module (16), referred to as a Browser (16), is based on at least one USSD telecommunication protocol and on at least one VXML language interpreter (21). The USSD CENTER (14) further includes charging, billing, proxy, routing, observation, ranking, and self-learning modules that execute the respective operations in real-time or offline. The USSD CENTER (14) further includes a WEB-type environment module for creating multilingual services, for test and for development of services and for managing the versions of the said services either locally or remotely. A method is implemented using the system (14), thus enabling a user to access USSD services via existing or new non-USSD services and enabling a user to access existing or new non-USSD services via USSD services.

31 Claims, 3 Drawing Sheets

Figure 1:
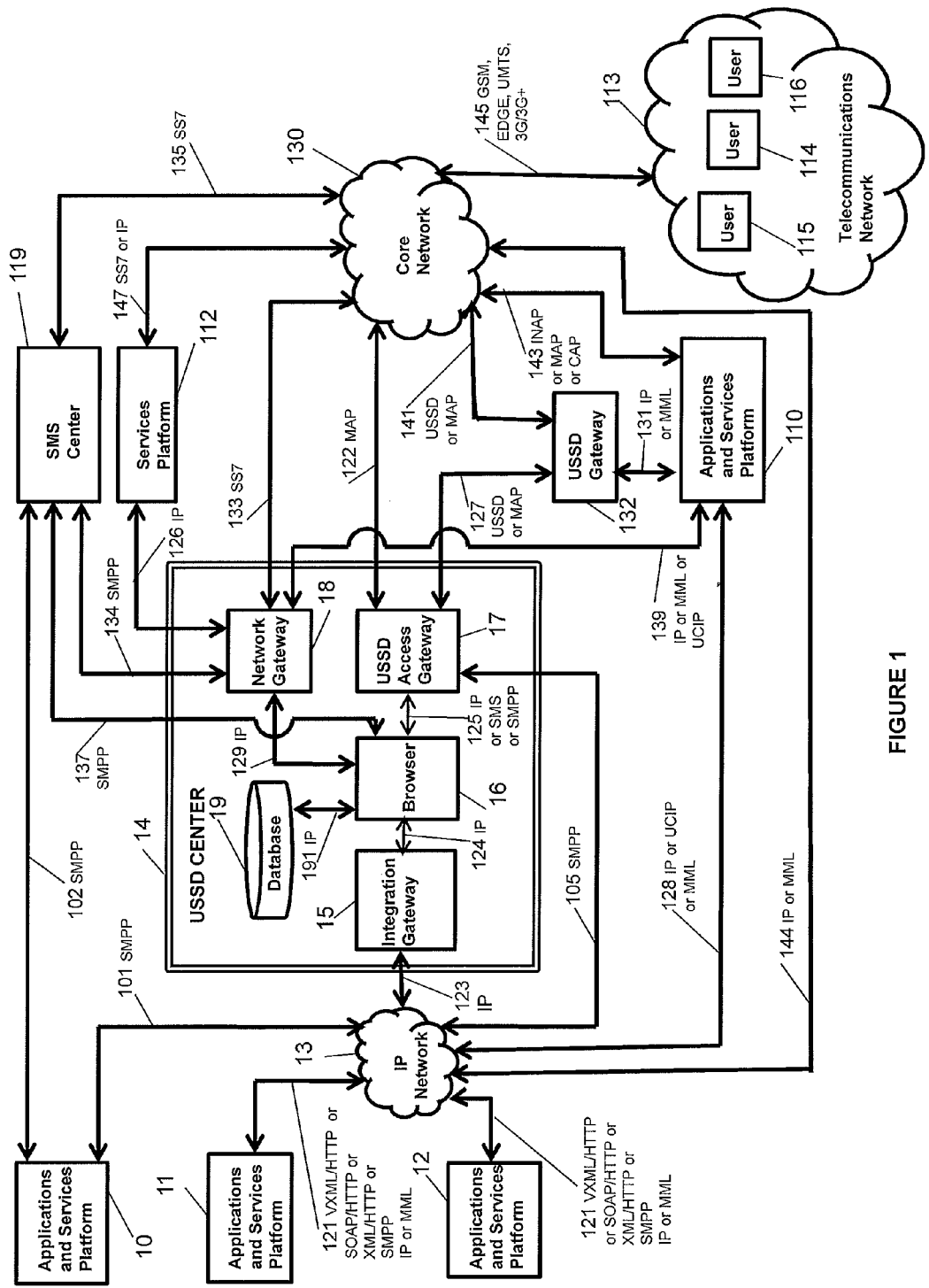

(51) Int. Cl.
  *H04W 88/18* (2009.01)
  *H04L 29/08* (2006.01)

(56) References Cited

U.S. PATENT DOCUMENTS

| | | | |
|---|---|---|---|
| 7,088,995 B2* | 8/2006 | Rao | 455/418 |
| 7,720,489 B2* | 5/2010 | Engelhart, Sr. | 455/456.5 |
| 7,756,545 B2* | 7/2010 | Roundtree | 455/550.1 |
| 8,499,087 B2* | 7/2013 | Hu | 709/229 |
| 2003/0139174 A1* | 7/2003 | Rao | 455/418 |
| 2003/0187999 A1 | 10/2003 | Callum | |
| 2004/0024846 A1* | 2/2004 | Randall et al. | 709/219 |
| 2008/0064385 A1 | 3/2008 | den Hartog et al. | |
| 2008/0146204 A1* | 6/2008 | Gu et al. | 455/414.1 |
| 2009/0061943 A1 | 3/2009 | Kamgaing-Kouam | |
| 2010/0048228 A1* | 2/2010 | Harju et al. | 455/466 |

OTHER PUBLICATIONS

Anonymous: "USSD Services for Interactive Mobile Users—Building User-Friendly Mobile Telephony Applications Using Dialogic Distributed Signaling Interface Components", Internet Article, Online Aug. 31, 2008, URL:http://www.dialogic.com/products/docs/appnotes/11038_USSD_an.pdf.

The Moriana Group: "Service Delivery Platforms and Telecom Web Services—An Industry Wide Perspective", Online Jun. 30, 2004, Mac Taylor, URL:http://www.morianagroup.com/.

International Search Report mailed Feb. 22, 2010.

* cited by examiner

GENERIC USSD CENTRE FOR NETWORK APPLICATIONS AND SERVICES

Applicant claims priority of Application PCT/FR2009/001045 filed Aug. 28, 2009, which claimed priority from French Application No. 0804815 filed Sep. 2, 2008, and from which Applicant also claims priority.

The present invention relates to a generic USSD CENTER for network applications and services.

The present invention is positioned in the area of conversational applications and client-server applications, more particularly in the field of dynamic dialogues between a terminal and a server for applications and services, using interactive interfaces, giving the ability to reach, dialogue, exchange information and use different applications and services.

The present invention is positioned in particular in the area of mobile telephony, in a context of expansion of new features, addition of interactive services, convergence of dialogue and communication means between heterogeneous devices, such as mobile phones, mobile devices, digital applications and services platforms, Internet servers, third parties services and devices, and others.

In the era of new emerging technologies, there is an increasing need to conceive systems for applications and services, in particular generic servers based on simple for implementation and use protocols, with ability for interactive, intuitive, easy to use navigation, and fast integration.

To these characteristics are added the "scalability" requirements (relative to the English word "scalability", which indicates the property of re-dimensioning a system or a method respectively in term of components or steps, of quality, size, resolution, band-width or other).

However, the cost constraint in material and human resources to set up such systems is important. The technical problem to be solved is thus to conceive with the lower possible cost a system for application and services, allowing to set up multiple and reusable applications and services, targeting the mass market. The problem is also to fulfill the increasing need for compatible interactive services enabled on existing and emerging technologies, without expensive integration, and preferably, with little or without modifications of network and user equipments.

To answer these problems, prior art knows various approaches, which however address only restricted and specific aspects of these problems, making possible concrete applications, however without proposing complete services such as navigation in various menus, providing from various applications, use of already available means in the devices, as standard implemented functionalities in native way, and also without important modifications of the digital servers or the end users equipments.

A known document of the prior art is the document FR2857816, which relates to a method for implementation of a voice communication, WAP ("Wireless Protocol Application") or MMS ("Multi-media Message Service") on a mobile phone. In the communication method, a preliminary step consists in offering the user with the possibility to activate or not such a communication. The choice to activate or not such a communication is proposed to the user by an USSD connection ("Unstructured Supplementary Service Data").

Nevertheless, this document is limited to the establishment of a connection for activation of a telephone voice communication via USSD, without however approaching aspects of architecture or implementation of navigation and auxiliary services.

Another well-known document of the prior art is the document EP0986275, which relates to a transaction method for ordering consumer items or services with a mobile phone. In this case an order for delivery is transferred to a service provider using the mobile network. Some order data, including billing, is encapsulated in one or more short communication messages such as SMS ("Shorts Message Service", short textual message being able to be emitted and received by a cellular phone), USSD or e-mail. The data is transmitted to a validation platform, connected to an enterprise center for short term communications. The cost of the indicated services is charged to the user account and it is transferred towards the service provider account.

However, this document relates foremost to the aspects of a specific transaction, based on existing protocols, but without addressing the problems of interactive USSD navigation systems or architecture for USSD generic equipment.

Another prior art reference is the document FR2819675, relative to a cell phone that includes a browser for a computer network such as Internet, means for capturing computer addresses received by the browser, to control storage means and recall of computer addresses provided in the phone. The phone also includes means for generating and presenting electronic icons, means for selecting these icons, means for storing icons and means for matching icons and computer addresses stored in the computer memory and means to recall them.

However, this document relates to a browser implemented in the user device and does not address aspects related to interpreters and browsers implemented on the network.

A document also known by the prior art, is the document WO/2007/030413 concerning a control channel for a VXML browser ("Voice eXtensible Markup Language", language voice extended tagging, which means an application programming interface for communication using peripheral devices related to the speech synthesis and telephony). This document focuses on a system that allows external applications to interact with a VXML browser running on a processor based on VXML interpreter. A control is functionally positioned between the external application and the VXML interpreter using a communication channel. The control inserts into the VXML interpreter instructions which are processed by the VXML browser in a conventional manner, to allow the external application to interact with the VXML browser.

However, this document is limited to the interpretation and to the VXML browser capabilities and their adaptation to a transport channel with standard protocols such as UDP ("User Datagram Protocol", communication protocol providing for the exchange of a minimum of data across a network), TCP ("Transmission Control Protocol", basic protocol for exchanging data over a network), or SIP ("Session Initiation Protocol", standard protocol for initiation of an interactive network session). Therefore, this document does not resolve the technical problem outlined in the present invention, namely, the navigation in non-voice services such as USSD or other, and any issues related to the specificity of the implementation and the integration of such a navigation.

The present invention relies on existing standards and protocols, open and already implemented on devices, thus already available. It is based on native functionality of networks and of terminals by providing a generic multi-applications and multi-services architecture. In addition, the implementation and the integration centralized on networks side, allow an optimal management of network resources and implementation efforts.

The present invention aims to overcome the prior art lack and to solves the stated technical problem by using an unique method and a generic system for multiple applications and services. The implementation of this method is based on the use and the adaptation of network protocols such as USSD with interpreters related to structured languages descriptors.

The present invention relates to a system for network applications and services based on standard network protocols such as USSD, containing at least one server for applications and services, including a dynamic interactive browser based on a language interpreter structured by conversational objects, such as VXML. The system for applications and services based on USSD protocols is centralized in a telecommunications or computer network. The browser based on a VXML interpreter, is integrated on the network.

In its broadest meaning, the present invention relates to a digital telecommunications system for the access, navigation and use of digital applications and services, called USSD CENTER, which includes at least one server for applications and services module, at least one access gateway module, at least one network gateway module, at least one integration gateway module and at least one database and profiling module, said server for applications and services module, called Browser, being based on at least one USSD telecommunication protocol and on at least one module interpreter of languages structured by objects, relative to descriptors structured by objects.

Preferably:
said interpreter of languages is such as VXML;
the access gateway module is based on at least one USSD protocol.

In one embodiment, the system is connected to at least one module such as SMSC.

In another embodiment, the system is connected to at least one module such as WAP gateway and/or OTA and/or IVR and/or GPRS for any telecommunications network.

Advantageously, the system is connected to at least one module such as SMS applications.

Preferably:
The system is connected to at least one network such as core network for mobile telecommunications network;
The core network is connected to at least one users network.

Advantageously, the system is connected to at least one set of network based on communications protocols and interfaces.

In one embodiment, the system is connected to at least one services module of telecommunication operators or of third parties and/or to at least one module for mobile value-added services.

In another embodiment, the system is connected to at least one module of systems said intelligent networks and for business support.

Advantageously, at least one server module for applications and services or at least one access gateway module or at least one network gateway module or at least one integration gateway module or at least one database and profiling module is self-sufficient.

Preferably, the server for applications and services includes at least one VXML interpreter, at least one USSD services module and at least one VXML files module.

In one embodiment, the USSD services module includes USSD services, unstructured or structured in menus, said USSD services being interactive or non-interactive.

In another embodiment, said services are multilingual for the whole end-to-end chain.

In a preferred embodiment example, the service logic is independent of services language for the whole end-to-end chain.

Preferably, said USSD CENTER includes at least one charging module and/or at least one billing module, and/or at least one observation and ranking module.

In a first preferred implementation, the USSD CENTER is a network browsing system.

In a second preferred implementation, the USSD CENTER is as system for hosting of third parties applications and services.

In a third preferred implementation, the USSD CENTER is a proxy system.

In a fourth preferred implementation, the USSD CENTER is a router system.

In a fifth preferred implementation, USSD CENTER is a Broadcast distribution system.

Preferably, an administration module includes a WEB-like system administration environment for creation, testing, deployment of services and version management of these services, a control module of the USSD CENTER and configuration modules for features, parameters and network gateways.

The present invention relates also to a method that is performed in a step of codes allocation for the USSD services or generic, a step of service logics creation, a step of testing, evaluation and versioning of the services, and a step of services activation, deployment, use and backup.

In one implementation, this method involves an additional step of rating in real-time or offline.

In another implementation, the method also includes an additional step of billing in real-time or offline.

Advantageously, the method includes a step of convergent unification of payment modes for all types of users (postpaid mode, prepaid mode, third party mode) of at least one telecommunications network.

Preferably, the method includes a further step of observation and ranking in real-time or offline.

In one embodiment, the method includes an additional step of distribution of data and services such as Broadcast.

Preferably, the Broadcast distribution step is followed by a step of interactive or not interactive exchange with the user.

In one embodiment example, the method includes an additional step of subscription and/or unsubscribe to at least one third party application.

In another embodiment example, the method performs the differentiation of the users, the users being subscribers and/or third party applications or services, in real-time using a dynamic customization.

In a preferred embodiment, users being subscribers and/or third party applications or services manage themselves their own environment for creation of services, applications and contents.

Advantageously, the environment for creation of services is accessible locally or remotely from a terminal by the operators and/or the third parties and/or the subscribers themselves.

In a first embodiment, the method defines at least one profile of at least one user and/or of at least one service.

In a second embodiment, the method performs a detection of the user behavior and generates features for assistance and/or self-study.

In a first particular implementation, the user accesses the USSD services via existing or new non-USSD services.

In a second particular implementation, the user accesses the existing or new non-USSD services via existing or new USSD services.

In a third particular implementation, the user accesses the existing or new USSD services via existing or new USSD services.

In a fourth particular implementation, the user accesses the existing or new non-USSD services via existing or new non-USSD services.

Advantageously, several existing USSD access codes are grouped into a single USSD access code.

In one embodiment, the method includes a step of static and/or dynamic modifications of the switched parameters.

In another embodiment, the method comprises a step of load sharing.

Preferably, the USSD browsing performs the supply, the consultation and the modification of at least one information managed in the core network.

Figure 2:
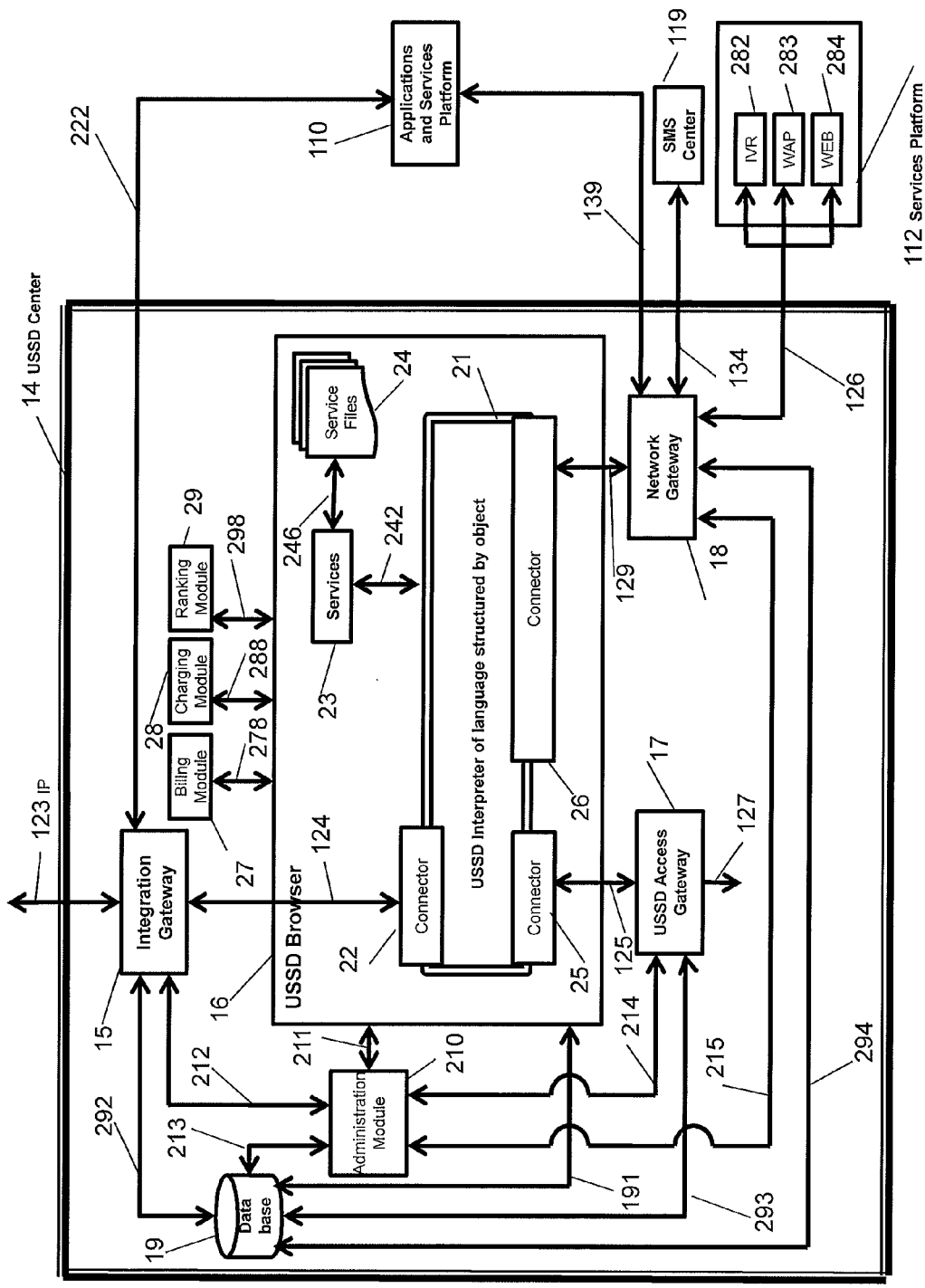
Figure 3:
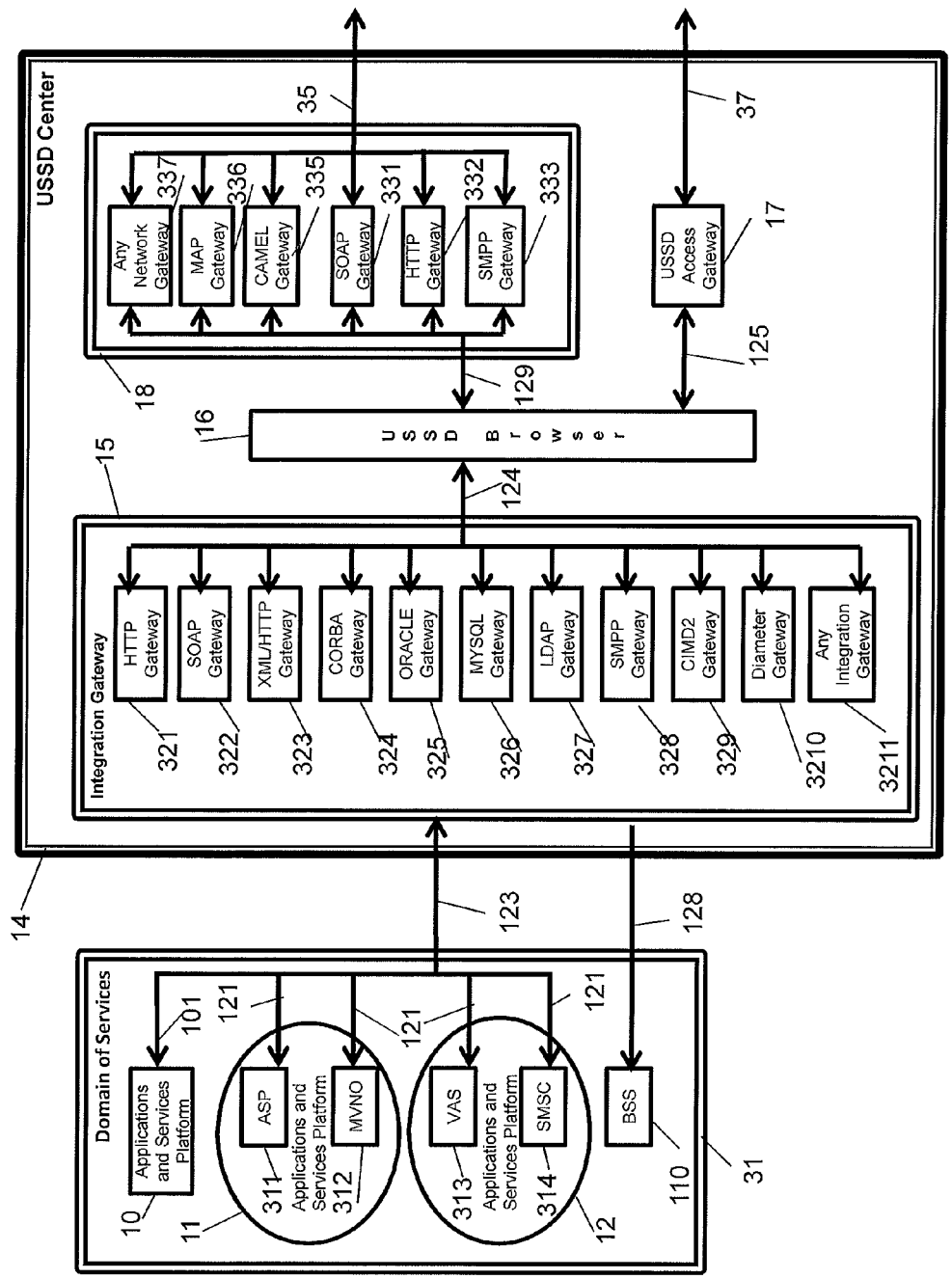

The present invention will be better understood with the help of the figures referring to the annexed drawings, which respectively show:

in FIG. 1, a general diagram of the architecture of the generic system, discussed in the present invention;

in FIG. 2, one particular embodiment of the USSD CENTER (14) and of the module (16) with its internal connections;

in FIG. 3, one particular embodiment of the USSD CENTER (14) with external connections of the module (16).

The general scheme of the present invention is illustrated in FIG. 1. A platform for applications and services (14), called in the present invention "CENTER for applications and services" or also "CENTER" is designed to perform and to bill services, for example such as messaging (USSD or SMS "Short Message Service", or other), such as "Browsing", i.e. navigation, such as "Hosting" and such as "Broadcast", i.e. distribution of data from a single source to a set of receivers.

The CENTER (14) is a generic open system, multi-applications and multi-services, which provides services compatible with standard protocols used in mobile phones, such as for example the protocols SS7 ("Signaling System 7", telecommunications protocol for high bits rate connections in circuit mode) and/or IP protocols ("Internet Protocol").

In the present invention, under the term "USSD generic system" is understood a system based on standard protocols, existing or new, enabling the implementation by using USSD, of any service and any existing or new application. Said center (14) is located within a server in a network such as mobile telecommunications network, SS7 network, 3G/3G+ network, NGN network ("Next Generation Networks", the generic name of any future telecommunications network), Internet computer network or any other digital network. This CENTER (14) consists of five main modules: a server for application and services (16) with a browser, called herein «Browser», said Browser being based on at least one USSD protocol, an USSD access gateway (17), a networks gateway (18) based on protocols compatible with telecommunications networks, an integration gateway (15), dedicated to information technology systems information and a data and profiling database (19).

In a general case, said CENTER (14) consists of at least one server for application and services (16), of at least one access gateway (17), of at least one networks gateway (18), of at least one integration gateway (15), and of at least one data and profiling database (19).

In a first particular case, said CENTER consists of a subset of the modules (16), (17), (18), (15) or (19).

In a second particular case, at least one module (16) or at least one module (17) or at least one module (18) or at least one module (15) or at least one module (19) is self-sufficient.

In the present invention is understood that a networks gateway is a platform or a set of intermediate platforms which processes and transmits information packets on a network or on multiple networks to the specified destination, and allows heterogeneous networks to communicate. Under the term "gateway" is understood therefore a networks gateway to any network, including at least one network interface.

The integration gateway (15) communicates with the server for applications and services (16), said Browser, via the link (124) and using at least one interfacing protocol, for example an IP standard protocol.

Under standard IP protocol is understood the set of IP protocols used in the networks. The Browser (16) communicates with the USSD access gateway (17) via the link (125) and using protocols for example such as IP, or SMS applications protocol, such as SMPP ("Short Message Peer to Peer"). The Browser (16) communicates also with the network gateway (18) via the link (129), using standard IP protocols for example. The Browser (16) exchanges data with the data and profiling database (19) via the link (191) using protocols such as IP. Said data and profiling database (19) contains information, for example on white lists and black lists regarding various users, on users profiles, on the services profiles and on the various usage statistics, used in the analysis and the service management. The module (19) also includes modules for static or dynamic definition of at least one user profile and of at least one service profile. Subsequently, said CENTER (14) such implemented is called USSD CENTER (14).

The USSD CENTER (14) is connected through the USSD gateway (17) to a network such as "Core Network" (130) ("Core Network", basic central network or core of the telecommunications network). The Core Network is for example such as core network for GSM ("Global System for Mobile telecommunications"), GPRS ("General Packet Radio Services", communications system with access using packets services), UMTS ("Universal Mobile Telecommunications System"), 3G/3G+ and/or any other core network such as for NGN. For instance, the network (130) is such as SS7 and communicates with the USSD CENTER (14) via the link (122) through which the communications are exchanged for example using the MAP protocol ("Mobile Application Protocol", protocol for mobile applications).

In another implementation, the USSD CENTER (14) is connected to the network (130) through the network gateway (18), via a link (133) and using one or more protocols such as SS7. For example, said link (133) consists of a CAP protocol ("CAMEL Application Part", application part protocol of CAMEL protocol "Customized Applications for Mobile network Enhanced Logic", allows a telecommunications operator to provide, inside or outside of its own network, special services to its users, such as real-time billing), of a INAP protocol ("Intelligent Network Application Protocol", application part for intelligent applications on SS7 protocol) or of a MAP protocol.

Said core network (130) includes different modules with which the network gateway (18) and/or the USSD gateway (17) exchange data. For example, these modules are such as HLR module ("Home Location Register"), MSC module ("Mobile Switch Center", center for mobile communications), VMSC module ("Visited Mobile Switching Center", visited center of mobile services), GMSC module ("Gateway Mobile Services Switching Center", switched mobile services gateway), SIGTRAN module (set of protocols defined for transporting SS7 messages over IP) or any other module related to mobile telephony.

Said core network (130) exchanges information via the link (145), with the set (113) of the users (114), (115), and/or (116). The set of users (113) is for instance such as network RAN ("Radio Access Network", the radio access network for mobile phones) for GSM, EDGE, UMTS, 3G/3G+ or for example such as PSTN ("Public Switched Telephone Network"), NGN, or any other digital network of a set of users. The communication link (145) is set up using standard protocols.

The user equipment, said terminal, is for example a mobile phone (said also cell phone), a PDA ("Personal Digital Assistant", handheld computer, combining many functions), a multi-functions board computer or for vehicle, a home or business multi-platform, including for example a monitoring or safety function, or any other fixed or mobile device being able to communicate with at least one network.

In the present invention, under the term "user" is understood an individual subscriber, fixed, nomadic or "Roamer" ("roamer", itinerant subscriber in the sense of "roaming" between networks) to at least one network, or a third party, for example a provider of applications, of services, of contents or of any equipment, for example alarm or signaling equipment.

The network gateway (18) is also connected to a services platform (112) via the link (126) and using protocols such as IP. The services platform (112) is for example WAP gateway, OTA ("Over The Air", standard protocol for transmitting and receiving information relating to an application for mobile phones), IVR ("Interactive Voice Response") or GPRS (for instance MMSC "Multi Media Messaging Service Center", multimedia service center). This platform (112) is also connected to the telecommunications network (130) via the link (147) and using standard or specific protocols, for example such as SS7 or IP. The gateway (18) is also connected to a module (119) which is such as SMSC (SMS Center), via the link (134) and using protocols such as SMPP. The SMSC module (119) is itself connected to the telecommunications network (130), via a link (135), using communications protocol such as SS7.

Preferably, the Browser (16) is also connected to the SMSC module (119) via the link (137) and using protocols such as SMPP. In this case, the USSD services are also offered as SMS services. Also, The USSD services are offered as services WAP, IVR, OTA, GPRS or 3G/3G+.

A third module (10) for processing of SMS applications, treats the SMS queries and communicates in a conventional manner with the SMSC module (119) via the link (102) and protocols such as SMPP.

In a particular implementation of the USSD CENTER (14), the application SMS queries of the module (10) are transmitted via the links (101) and (105) with protocols such as SMPP and are processed directly by the USSD access gateway (17), allowing these external SMS services to be available in USSD.

Also, other existing non-USSD services such as IVR, OTA, WAP, GPRS or 3G/3G+ are available via USSD. In general, using this architecture, the user accesses the USSD services via non-USSD services, existing or new, and also the user accesses the non-USSD services, existing or new, via USSD.

The USSD CENTER (14) is connected via a link (123) which is for example such as IP, to a set (13) of IP networks which includes various protocols, linked to platforms for applications and services (10), (11), (12) and (110). Through this set of networks (13), the USSD CENTER (14) has access to platforms (12), for example such as VAS ("mobile Value-Added Services"). Data between this set of networks (13) and the platform (12) are exchanged via the link (121) using standard protocols, such as for example VXML/HTTP ("HyperText Transfer Protocol" text transfer protocol), SOAP/HTTP ("Simple Object Access Protocol", standard protocol for the WWW services ("World Wide Web" or "WEB", global network), XML/HTTP ("XML", "extended Markup Language", extended markup language for describing and analyzing data), SMPP, or using proprietary protocols such as for example «ORACLE» ® (server for interface and applications for mobile chain), «MySQL» ® (relational database), LDAP ("Lightweight Directory Access Protocol", simplified protocol for accessing databases), DIAMETER (IP extension for mobile), RADIUS (IP extension for mobile), MML ("Man-Machine Language") or other kinds of protocols.

According to one implementation through the network (13), the USSD CENTER (14) has access to a platform (11), such as for example ASP ("Applications Service Providers", providers for applications and services), or such as MVNO ("Mobile Virtual Network Operator"), or other third parties such as for instance banks, with which through the network (13), the USSD CENTER (14) exchanges information via a link such as (121).

In a particular embodiment, a portion of the set of networks (13) is connected with one or many platforms of the network (130) via for example an IP link (144), such as MML or TELNET ("TELecommunication NETwork", network protocol to remotely execute controls). This is an effective and practical way for the USSD CENTER, to propose via browsing the supply, the consultation and the modification of the information managed in the core network (130) and by default inaccessible for the users.

In one embodiment example, the network (130) has access to the service platform (110) such as for instance BSS ("Business Support Systems") via the link (143) using protocols such as INAP, MAP, CAP and CDR ("Call Data Records", recording of the call data). The BSS module (110) is for example such as post-paid billing module or a prepaid billing module, such as IN ("Intelligent Network", concept defining advanced functions driving the equipments of the phone network).

The platform (110) is also connected via the link (131) using specific or proprietary protocols, to a gateway (132), which is for example such as USSD dedicated to modules such as BSS. The gateway (132) communicates with the network (130) via a link (141) using the USSD MAP protocol and with the USSD gateway (17) via a link (127) using the USSD MAP protocol. The link (127) is in this case merged with any link such as (141). This particular connection makes it possible to configure the architecture of FIG. 1 for new services.

In a particular embodiment, the platform (110) exchanges information with the network (13) via the link (128), using standard or proprietary protocols, specific to the platform (110), such as for example «Ericsson» ® UCIP ("User Communication Integration Protocol", «Ericsson» ® specific protocol), «Huawei» ® MML, the applications protocol "Corba" for NSN ((«Nokia Siemens Network» ®) BSS, Corba for «Alcatel» ® BSS, or Corba for «LHS» ® BSS. In another embodiment, the platform (110) is directly connected to the network gateway (18) via the link (139), using standard or specific protocols.

The generic architecture described in this no limiting example, comprising the modules and the links illustrated in FIG. 1, presents a dynamic and interactive system for the access and the use of multiple applications and services by users of at least one telecommunications network (113). Using this architecture, new services are offered to users through classical interfaces, such as USSD, SMS, IVR, WAP, GPRS or 3G/3G+. In addition, an USSD access is opened to the users for existing classical services, such as SMS, IVR, WAP, GPRS or 3G/3G+.

Also, classical and difficult to use network features such as call forwarding, Roaming functions ("roaming", inter-network roaming), short numbers, callbacks and others are made convenient and easy to use thanks to the USSD CENTER (14). In addition, real-time services are offered, such as for example the differentiation of a user in roaming mode, and for example, an appropriate dynamic customization and profiling.

Advantageously, are added supplementary modules such as (10) (11), (12) or (110), of telecommunication operators or of third parties. In this way, the architecture shown in FIG. 1, including the module (14), the network (13) and the modules (11), (12) and (110), has properties of scalability adapted to the capacity of processed information in terms of data, applications, services, networks or others.

The USSD CENTER (14) manages applications and services in function of the network resources and plans routing of each task in function of the available bandwidths or queries, requesting additional allocation of resources.

In a particular embodiment, telecommunication operators have access to this architecture in order to do operational and load testing of external systems. The USSD CENTER (14) therefore offers possibility for connections and testing of additional modules. Preferably, all connections of the USSD CENTER (14) to external systems are based on pre-requisites for security of these systems. The exchanges are unsecured or secured using for example an encryption, such as for example SSL ("Secure Socket Layer", a protocol that encrypts data sent by a browser, or other).

The present invention is detailed below with preferred and not limiting embodiment examples. In a preferred implementation, the Browser (16) is designed based on USSD protocol and on a structured VXML language interpreter.

An example of a preferred embodiment of the module Browser (16) is shown in FIG. 2.

Said browser (16) includes at least one interpreter of language structured by object (21). In this preferred example of implementation the interpreter (21) is such as VXML. The VXML interpreter (21) exchanges information with a module (23) containing lists of services or also USSD menus, via the link (242) and using protocols such as VXML. USSD menus are unstructured or structured. At least one given service is described using call of VXML files (24) via the link (246) and using VXML protocol, in order to identify the context and the properties of the communication with each user of mobile phones. In this case, the Browser (16) is based on VXML.

In this way the navigation is done through menus such as USSD. All USSD services of the module (23) are deployed in the browser as VXML files (for example VoiceXML v2), and downloaded into the memory of the VXML interpreter (21). Preferably, the VXML interpreter (21) is designed to take into account the specifications of the USSD protocol communication. The VXML interpreter (21) uses internal virtual memories (or "caches") for already interpreted queries, and thus they are interpreted for the same USSD sequence without navigation, i.e. without a new interpretation of the already explored service tree structure.

In a first preferred embodiment, said Browser (16) is configured as a browser. The browsing logic is similar to that of a WEB browser. Configuration interfaces indicate lists and sub-lists of all principal existing services and applications, these lists and sub-lists are respectively called pages and sub-pages or menus and submenus.

For example, USSD service codes are generated and assigned to menus. In one embodiment, the USSD service codes are assigned to all menus. In another embodiment, the service codes are assigned to some of the menus.

Preferably, the menus (23) represent at least one USSD page, these USSD pages being linked to a browsing logic. The menus are enabled or disabled, for example by an internal administrator (210) and their state is indicated in the USSD CENTER (14) with configuration messages stored in the data and profiling database (19).

The browsing method, including the generation, the allocation and the management of menus, is defined by several steps:
Allocation of the USSD service codes; In cases where existing USSD service codes are not assigned in advance, temporary USSD codes are generated by the internal administrator (210).
Creation of service logic, including a definition of nodes and sub nodes, programming of marker variables, definition of remote URLs ("Uniform Resource Locator");
Testing, evaluation and versioning of the services;
Activation, deployment and use of the services.

The Browser (16) allows thus to perform browsing from a main menu to sub-menus with direct access through an USSD string, creating a "shortcut". The shortcut includes sequence of user response from the USSD screen to modify.

For example, a simple USSD sequence is such as: #123*1*2#

The Browser (16) interprets each parameter of the USSD string from the user in a sequential way and will then display the appropriate menu. In the case where the menu is a last node, the Browser (16) will send a query such as HTTP to a service provider, which will as feedback, provide for example the desired content.

Using the Browser (16), dynamic operations are set up and performed, such as navigation with feedback, navigation from a main menu, navigation from an intermediate menu, browsing interruption. Advantageously, these operations are accompanied by analysis capabilities, configuration and store in the user profile. Under the term "user profile" is understood the set of characteristics related to at least one connection and to at least one session, for example: IP address, phone number, location, time and date of the connection, duration of the connection, language of the browsing, geographical location, types of required applications and services, required contents, and any other characteristic related to this connection.

Preferably, the USSD CENTER (14) contains a multilingual menu configuration for the whole end to end chain (between the final subscribers and the service providers for example). Also, the services logic is independent of the languages for the whole end to end chain.

The Browser (16), as designed, has network architecture and connections, which are multiple, dynamic and interactive. The Browser (16) includes internal connectors, for example communication interfaces with the gateways (15), (17) and (18), and these internal connectors may include at least one sub-connector. By using the connector (22), the Browser (16) communicates with the integration gateway (15) via a link (124). The Browser (16) is also connected to the USSD access gateway (17) via the USSD connector (25) and a link (125). Also, the Browser (16) communicates with the network gateway (18) via the connector (26) and a link (129).

In a particular embodiment, the network gateway (18) is connected to the platform (112) via a link such as (126), specifically with modules such as IVR (282), WAP (283) and WEB (284). In this way, services such as IVR, WEB or WAP are proposed via USSD protocols. In general, any digital service, and any new or existing application for network systems can be set up by USSD protocols.

In another particular embodiment, the network gateway (18) is connected with the services platform SMSC (119) via the link (134). The integration gateway (15) exchanges data with the BSS platform (110) via the link (222) which is a composition of link (123), network (13) and link (128). Also the networks gateway (18) exchanges data with the said BSS platform (110) via the link (139). In a first implementation example, the module (110) is connected only to the module (15). In a second implementation example, the module (110) is connected only to the module (18). In a third implementation example, the module (110) is connected to the module (15) and to the module (18).

The data and profiling database (19), comprises a module for defining of at least one user profile and at least one service profile, and exchanges separately information with the module (15) via the link (292), with the module (16) via the link (191), with the module (17) via the link (293) and with the module (18) via the link (294). In this manner, configuration information, various administration data, statistics and information about users and services profiles are completed, used and inter-exchanged between the modules (15), (16), (17) and (18).

In a particular embodiment example, the data and profiling database (19) is connected only with the Browser (16) via the link (191), in which case the links (292), (293) and (294) are omitted. Preferably, the data and profiling database (19) contains information on the characteristics of sessions, static and dynamic statistics.

In a second preferred embodiment, the Browser (16) is configured such as "Hosting" platform, or hosting of applications and of external or third parties services. Third parties access is enabled in a secure way for creation and activation of applications and services. These third parties then operate only the codes of the services they offer.

The embodiment such as hosting in the present invention, allows telecommunication operators to set up USSD services, operated by third parties such as service providers. The third parties access is completely secured. Telecom operators create one or many accounts for each third party by attributing at least one access code and USSD resources. Each service provider uses the same user interface as the telecom operator and operates remotely its own USSD application, in the operating limits assigned by the telecommunications operator. For each services provider is recorded history of activities and of operations. Furthermore, the environment for creating services and applications is provided not only to services providers, but also to various users and subscribers, who in this way adapt and customize their own applications, services and contents. In a third preferred embodiment, the USSD CENTER (14) is configured as an USSD "proxy" (module of an USSD system connected to another USSD system and performing queries (and their backup) for the services needs). This embodiment, concerning for example the module (110), is achieved via the specific gateway (132). The classic link (141), connecting the gateway (132) to the network (130), is then merged by the module (110) with the link (127) connecting the gateway (132) to the USSD gateway (17). The applications and services of module (110) are then appropriated by the USSD CENTER (14).

In this way, it becomes possible for the operator to group several USSD access codes in a single access code and also to introduce new services (USSD or not), which are not feasible without modifications of existing network elements. In a fourth preferred embodiment, the USSD CENTER (14) is configured as active routing platform, which provides USSD-like mediation between different network elements and solves problems related to routing of users, of services and of applications. These problems are for example the routing of the user towards a BSS platform (110), the routing such as MNP ("Mobile Number Portability") and others.

When the USSD CENTER (14) performs proxy and router functions, it has the ability to make static and/or dynamic changes on commuted parameters.

When the USSD CENTER (14) performs proxy and router functions, it has the ability to perform load sharing functions.

In a fifth preferred embodiment, the USSD CENTER (14) is configured to perform distribution, such as Broadcast, of data and services to multiple users, for example broadcast advertising, event alerts or other useful information. In one implementation, the Broadcast is followed by a user response and interactive exchange, for example for applications such as consumer enquiries and surveys.

Moreover, a Broadcast service creation environment allows to services providers and end users to adapt and customize their own Broadcast distributions.

Advantageously, the Broadcast environment of the USSD CENTER (14), enables the operators to launch also conventional broadcast services, such as SMS, IVR, WAP, GARS or 3G/3G+.

In an embodiment example of the USSD CENTER (14), the Browser (16) communicates via the link (278) with a billing module (27). In this way the contents requested by the same user are generally subject to a control and to a billing in real-time or offline.

In another embodiment example of said USSD CENTER (14), the Browser (16) communicates via the link (288) with a charging module (28).

Both embodiments are applied to any kinds of users: with subscription, prepaid mode, roaming, fixed or nomadic.

The USSD CENTER (14) manages for example the billing with subscription or in prepaid mode, by using an approach called external payment procedure. A specific procedure for external billing is specified in the USSD services logic during the creation of the service and is triggered in real-time during the user session. The payment procedures are in accordance with the specific payment requirements of the operator or the third party.

During the session, a mobile user in roaming is also identified, so that his navigation is taken into account in an appropriate way during the payment procedure. Advantageously, this case is available through the use of the USSD CENTER (14) functionalities.

In general, the USSD CENTER (14) includes a payment system that makes the charging and/or the billing in real-time or offline, and therefore allows the convergence of the different services and modes of payment (prepaid, with subscription and mixed).

In a particular embodiment example, users subscribe to any service using the USSD CENTER (14). Preferably, the USSD CENTER (14) includes a feature to change or to automatic cancel the subscription, either following the request of the user or following the request of the services provider.

In one particular implementation of said USSD CENTER (14), the Browser (16) communicates via the link (298) with a module (29), for which a method of observation and ranking is defined. Preferably, the method of observation and ranking makes in real-time or offline observation, analysis and ranking of user behavior, content, services, providers and other users. This method is used for example for the analysis and ranking of services and their subparts, and also for revenue generation. The observation and ranking parameters are defined during or after the process of service creation.

During the session, network management administration (210), integrated in the USSD CENTER (14), generates in real-time the required parameters and automatically creates an observation and/or ranking events.

In one embodiment example, the billing module (27), the charging module (28) and the observation and ranking module (29) are integrated within the Browser module (16). The internal management administration (210) of the USSD CENTER (14) is connected with the Browser (16) and therefore with the VXML interpreter (21) via a link (211). The module (210) is able to support at the same time all the deployed services, including generic USSD operations initiated by the telecommunications network and the mobile terminal, as well as sessions or dialogue of a bilateral USSD session. The observation and the ranking are applicable to service providers, and to users. The observation is based on defined parameters, such as for example: the type of the event, the date and time of the event, the duration of the session, the number of exchanges during the session, the application code of the service (end-user or any network), the VAS provider, the message content (based on keywords or content codes), the location of the end user. Also, a combination of observation factors is correlated with event phenomena, such as for example holidays, sports championships, advertising campaigns.

In its most general definition, the administration module (210) includes a system administration such a WEB, including a WEB environment for creation of services, testing, deployment and version control of these services, a management module of the system USSD CENTER (14) and modules for features, parameters and network gateways configuration. The environment for services creation is accessible locally, remotely or from a terminal by the operator and/or by third parties and/or by users themselves. The administration system controls connections, data collection, analysis, and statistics. The system administration module (210) is connected with at least one other internal module of the USSD CENTER (14), other than the Browser (16). The system administration is for example connected with the integration gateway (15) via link (212), with the USSD gateway (17) via link (214), with the network gateway (18) via link (215) and with the data and profiling database (19) via link (213).

Thanks to the data and profiling database (19), the USSD CENTER (14) has the ability to determine in real-time the profile of a user or of a group of users. The user profile is completed by its usage profile relative to at least one service and to a set of parameters specific to the sessions for this service. By using the data and profiling database (19), the USSD CENTER (14) has the ability to determine in real-time the profile of a service or a set of services. This profile consists of information such as for example the lack of accessibility to free services or to a particular group of users, the definition of white and black lists, and others.

In function of the detected user behavior, the USSD CENTER (14) has the ability to trigger an event for assistance, by setting up a self-learning. Thus, the USSD CENTER (14) delivers in real-time assistance adapted to the user when such is necessary. In one embodiment, the USSD CENTER offers management of services and of contents performed directly by users. For example, the services and the contents are created or customized by the user himself using a WEB site or directly using the mobile terminal.

Preferably, the USSD system for browsing and for hosting generates CDR files. Once created, for instance, the files for billing are available for the telecommunications operator or for the services providers. The frequency of updating of these files is, for example, at least once per minute. Their format is, for example such as "ASN.1 Structured" ("Abstract Syntax Notation One Structured", standard way for describing a message sent or received by the network).

In one particular implementation, the CDR files syntax is adapted by the telecom operator and some parameters are modified. The various CDR formats are generated using presets parameters. For each node in the tree of the service logic, the choice of CDR formats and their uses by an administrator are flexible. Said administrator is in this case an operator, a services provider or any third party to whom the administration of the services has been delegated. FIG. 3 illustrates a non-limiting embodiment example of the architecture referenced in FIG. 1 and FIG. 2 with external connectors to the Browser module (16). The Browser module (16) is represented in architecture with the integration gateway module (15), which includes at least one integration interface module. Preferably, the interface modules are based on protocols such as HTTP (321), SOAP (322), XML/HTTP (323), CORBA (324), « ORACLE » ® (325), « MySQL » ® (326), LDAP (327), SMPP (328), CIMD2 (329) ("Computer Interface to Message Distribution, version 2", distributing messages interface), Diameter (3210), or any integration gateway (3211). In the integration gateway module (15), integration interfaces are such as client, server, client-server or "Peer to Peer", point to point communication. Also, the module (15) is connected via a link such as (123) and using IP protocol with a module (31) comprising a set of services, for example VAS services. The module (31) includes, for example, the module (11) which contains a MVNOs module (312) and an ASP module (311), and includes the module (12) which consists of a VAS module (313) and of a SMSC module (314). The module (15) communicates with the modules (11) and (12) via a link such as (123), followed by a link as (121).

The module (31) also includes a service platform such as BSS or IN (110), with which the module (15) communicates via a link such as (128). Also, the module (31) includes an SMS applications platform (10), with which the module (15) communicates via a link (123), followed by a link (101). In order to access multiple computer and telecommunications networks, the Browser module (16) is connected to the network gateway module (18) via a link such as (129). The module (18) contains at least one network gateway such as SOAP (331), HTTP (332), SMPP (333), CAMEL (335), MAP (336) or any network gateway (337). In the network gateway module (18), the network interfaces are such as client, server, client-server or "Peer to Peer", point to point communication.

The module (18) has access to networks, for instance via a link (35) which is for example such as (133) and/or such as (126) and/or such as (134), and/or via a link (37) which is for example such as (127) and/or such as (122).

FIG. 3 of the present invention illustrates the unique and not limiting architecture of the generic USSD CENTER (14) presenting multi-application and multi-service characteristics, compatibility and interoperability with existing systems, scalability in terms of network performance and network connections and, therefore, in terms of applications and services.

The USSD CENTER (14) is an open platform adapted to existing standards, with multi-service and multi-operator capabilities. The USSD CENTER (14) enables deployment of new services, providing opportunities for multiple mobile applications. The user interaction with mobile applications is easy and instantaneous, the response time is guaranteed and the interactions during the session are supported, unlike of the services such as SMS and GPRS. The USSD protocol is fully supported by the GSM network and the addition of the USSD CENTER (14) in a telecommunication network does not require network modification. The USSD CENTER (14) supports user (115) initiated sessions such as "pull" ("pull", withdrawal) and network initiated sessions initiated by the application server (16) such as "push" ("push", pushing), with unilateral or bilateral interactivity.

Using a simple reconfiguration, mobile applications such as SMS, STK ("SIM Tool Kit"), WAP, IVR and others, are immediately available.

The fact, that the USSD gateway (17) and the USSD Browser (16) are open platforms, allows the integration of different network protocols and multiple deployments with capacities of several thousand transactions per second.

For example, the USSD CENTER (14) is used for banking services and applications, Broadcast, advertisement, alerts, traffic simulation and various network services. Also, the USSD CENTER (14) is used for content management by geographical location, as well as for multitude of emerging SPs ("Services Providers") applications. Telecom operators have access to the USSD CENTER also to test external systems functionally and under load. Additional modules are integrated, such as supervision and security modules, or any other fixed or mobile device modules being able to communicate with at least one telecommunications network.

A particular and non-limiting embodiment of the USSD CENTER module (14) is performed using hardware platforms such as HP («Hewlett Packard» ®), FSC («Fujitsu-Siemens Computers» ®), IBM («International Business Machines» ®)) or «SUN Microsystems» ®. The operating system is for example such as «Red Hat Enterprise» ® or «Fedora Linux» ®, or such as «Sun Solaris» ®.

The invention claimed is:

1. A digital telecommunications system having an unstructured supplementary service data center, comprising:
    an unstructured supplementary service data center, the unstructured supplementary service data center comprising a server, the server comprising an unstructured supplementary service data protocol based telecommunications network browser, wherein the telecommunications network browser is directly connected to a core telecommunications network by an unstructured supplementary service data access gateway and the telecommunications network browser provides navigation in the core telecommunications network, wherein the unstructured supplementary service data center provides non-unstructured supplementary service data services to the core telecommunications network by unstructured supplementary service data services logic, and wherein unstructured supplementary service data protocol is interpreted by a voice extensible markup language interpreter;
    a network gateway that communicates with the telecommunications network browser and the core telecommunications network;
    an integration gateway that communicates with the telecommunications network browser and communicates with a plurality of applications and services; and
    a database comprising profiling information for services and profiling information for users that communicates with the telecommunications network browser.

2. A digital telecommunications system having an unstructured supplementary service data center according to claim 1, wherein the telecommunications network browser comprises a language interpreter that is supported by voice extensible markup language.

3. A digital telecommunications system having an unstructured supplementary service data center according to claim 1, wherein the unstructured supplementary service data access gateway communicates with the telecommunications network browser using short message peer to peer protocol.

4. A digital telecommunications system having an unstructured supplementary service data center according to claim 1, wherein a short message service center communicates with the telecommunications network browser.

5. A digital telecommunications system having an unstructured supplementary service data center according to claim 1, wherein the network gateway communicates with the core network of the mobile communications network by a Signaling System 7 protocol.

6. A digital telecommunications system having an unstructured supplementary service data center according to claim 1, wherein a short message service center communicates with the telecommunications network browser by a short message peer to peer protocol.

7. A digital telecommunications system having an unstructured supplementary service data center according to claim 1, wherein the unstructured supplementary service center communicates with the core network of the mobile communications network, and the core network is connected to a user network.

8. A digital telecommunications system having an unstructured supplementary service data center according to claim 1, wherein the voice extensible markup language interpreter support provides interactive user services.

9. A digital telecommunications system having an unstructured supplementary service data center to claim 1, wherein the voice extensible markup language support provides user services that are not interactive.

10. A digital telecommunications system having an unstructured supplementary service data center according to claim 1, wherein the unstructured supplementary service data access gateway that communicates with the telecommunications network browser provides mobile communications network browsing.

11. A digital telecommunications system having an unstructured supplementary service data center according to claim 1, wherein the unstructured supplementary service data center provides routing services.

12. A digital telecommunications system having an unstructured supplementary service data center according to claim 1, the unstructured supplementary service data center for digital telecommunications applications and services further comprising an administration module, the administration module structured to create unstructured supplementary service data services, wherein the administration module communicates with the telecommunications network browser and creates, tests, deploys and manages applications and services.

13. A digital telecommunications system having an unstructured supplementary service data center according to claim 1, wherein both the network gateway that communicates with the telecommunications network browser, and the integration gateway that communicates with the telecommunications network browser, communicate with the plurality of applications and services.

14. A digital telecommunications system having an unstructured supplementary service data center according to claim 1, wherein the unstructured supplementary service data center for digital telecommunications applications and services comprises a plurality of gateways that each communicate with the telecommunications network browser and with the plurality of applications and services.

15. A method of access, navigation and use of digital applications and services in a digital telecommunications system, wherein the method comprises the steps of: a) allocating codes of unstructured supplementary service data services, b) creating a logic of the unstructured supplementary service data services, c) testing, evaluating and versioning the unstructured supplementary service data services, d) activating, deploying, using and saving the unstructured supplementary service data services, and e) providing non-unstructured supplementary service data services by unstructured supplementary service data services logic;

wherein the digital telecommunications system comprises:

a server comprising an unstructured supplementary service data protocol based telecommunications network browser;

an unstructured supplementary service access gateway that provides communication directly between the core network and with the telecommunications network browser, wherein the telecommunications network browser provides navigation in the core telecommunications network, and wherein unstructured supplementary service data protocol is interpreted by a voice extensible markup language interpreter;

a network gateway that communicates with the telecommunications network browser;

an integration gateway that communicates with the telecommunications network browser and communicates with a plurality of applications and services; and a database that communicates with the telecommunications network browser.

16. A method of using a digital telecommunications system for the access, navigation and use of digital applications and services according to claim 15, further comprising the step of monitoring and ranking the unstructured supplementary service data services in real time.

17. A method of using a digital telecommunications system for the access, navigation and use of digital applications and services according to claim 15, further comprising the step of monitoring and ranking the unstructured supplementary service data services offline.

18. A method of using a digital telecommunications system for the access, navigation and use of digital applications and services according to claim 15, further comprising the step of subscribing to at least one of the digital applications of the unstructured supplementary service data services.

19. A method of using a digital telecommunications system for the access, navigation and use of digital applications and services according to claim 15, further comprising the step of unsubscribing to at least one of the digital applications of the unstructured supplementary service data services.

20. A method of using a digital telecommunications system for the access, navigation and use of digital applications and services according to claim 15, further comprising the step of differentiating users of the system, wherein the step of differentiating users of the digital telecommunications system is performed by the server comprising a telecommunications network browser in real-time using dynamic customization learned by the telecommunications network browser from user behavior.

21. A method of using a digital telecommunications system for the access, navigation and use of digital applications and services according to claim 15, further comprising the step of the users managing of the digital telecommunications system services, applications and contents.

22. A method of using a digital telecommunications system for the access, navigation and use of digital applications and services according to claim 15, further comprising the step of accessing a creation environment for services of the server comprising a telecommunications network browser and data base by a member of a group consisting of telecommunications service providers, third parties and subscribers.

23. A method of using a digital telecommunications system for the access, navigation and use of digital applications and services according to claim 15, further comprising the step of defining a profile of a user of the digital telecommunications system and a service employed by the user.

24. A method of using a digital telecommunications system for the access, navigation and use of digital applications and services according to claim 15, further comprising the steps of the server comprising a telecommunications network browser detecting of user behavior and the server comprising a telecommunications network browser generating features of the digital telecommunications system for user assistance.

25. A method of using a digital telecommunications system for the access, navigation and use of digital applications and services according to claim 15, further comprising the step of a user of the digital telecommunications system accessing the plurality of unstructured supplementary service data services via non-unstructured supplementary service data services.

26. A method of using a digital telecommunications system for the access, navigation and use of digital applications and services according to claim 15, further comprising the step of a user of the digital telecommunications system accessing the plurality of unstructured supplementary service data services via unstructured supplementary service data services.

27. A method of using a digital telecommunications system for the access, navigation and use of digital applications and services according to claim 15, further comprising the step of a user of the digital telecommunications system accessing non-unstructured supplementary service data services via a non-unstructured supplementary service data services.

28. A method of using a digital telecommunications system for the access, navigation and use of digital applications and services according to claim 15, further comprising the step of modifying switched parameters.

29. A method of using a digital telecommunications system for the access, navigation and use of digital applications and services according to claim 15, further comprising the step of load sharing.

30. A method of using a digital telecommunications system for the access, navigation and use of digital applications and services according to claim 15, further comprising the steps of supplying information to a core network and managing the information, and consulting and modifying the information managed in the core network, wherein the server comprising a telecommunications network browser performs the steps of supplying, consulting and modifying the information in the core network.

31. A method of using a digital telecommunications system for the access, navigation and use of digital applications and services according to claim 15, further comprising the steps of the unstructured supplementary service data center creating services by an administration module that is within the unstructured supplementary service data center, wherein the administration module communicates with the telecommunications network browser and the administration module creates, tests, deploys and manages applications and services.

* * * * *